US012726397B2

(12) United States Patent
Stockert et al.

(10) Patent No.: US 12,726,397 B2
(45) Date of Patent: Sep. 1, 2026

(54) SYSTEM AND METHODS FOR SELF-LEARNING MANAGEMENT OF NEXT GENERATION NETWORKS

(71) Applicant: AT&T Intellectual Property I, L.P., Atlanta, GA (US)

(72) Inventors: Mark Stockert, San Antonio, TX (US); Jerry Robinson, Middletown, NJ (US); Vijay Bhaskar Uppala, Bothell, WA (US); Joseph Dahan, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 118 days.

(21) Appl. No.: 18/756,385

(22) Filed: Jun. 27, 2024

(65) Prior Publication Data

US 2026/0005910 A1 Jan. 1, 2026

(51) Int. Cl.
*G06N 3/0475* (2023.01)
*G06F 40/205* (2020.01)
(Continued)

(52) U.S. Cl.
CPC ............ *H04L 41/04* (2013.01); *H04L 9/0852* (2013.01); *H04L 41/0897* (2022.05)

(58) Field of Classification Search
CPC .... G06N 3/0475; G06N 3/094; H04L 41/145; H04L 41/16; H04L 41/147; H04L 41/04; H04L 9/0852; H04L 41/0897
See application file for complete search history.

(56) References Cited

U.S. PATENT DOCUMENTS 11,310,104 B2 4/2022 Stockert et al.
11,438,228 B1 * 9/2022 Belton, Jr. .......... H04L 41/0803
(Continued)

FOREIGN PATENT DOCUMENTS

EP 3637685 A1 * 4/2020 ......... H04L 41/0897

OTHER PUBLICATIONS

C. Xu, M. B. Mashhadi, Y. Ma, R. Tafazolli and J. Wang, "Generative Semantic Communications With Foundation Models: Perception-Error Analysis and Semantic-Aware Power Allocation," in IEEE Journal on Selected Areas in Communications, vol. 43, No. 7, pp. 2493-2505, Jul. 2025, doi: 10.1109/JSAC.2025.35591.(Year 2025).*
(Continued)

*Primary Examiner* — Umar Cheema
*Assistant Examiner* — Golam Mahmud
(74) *Attorney, Agent, or Firm* — Guntin & Gust, PLC; Miyoung Shin

(57) ABSTRACT

Aspects of the subject disclosure may include, for example, a system including: one or more probes in a communication network; a processing system including a processor; and a memory that stores executable instructions that, when executed by the processing system, facilitate performance of operations of: collecting data from the one or more probes and application program interfaces of network elements in the communication network; converting the data into semantic vectors using an embedding model; storing the semantic vectors in a vector database; using foundation models to generate outputs based on the semantic vectors; generating synthetic data using a generative adversarial network, wherein the synthetic data is used test the foundation models; using federated reinforcement to incorporate human feedback into the semantic vectors; and managing the communication network based on the outputs. Other embodiments are disclosed.

20 Claims, 10 Drawing Sheets

(51) Int. Cl.

| | |
|---|---|
| ***G06F 40/30*** | (2020.01) |
| ***G06N 3/044*** | (2023.01) |
| ***G06N 3/045*** | (2023.01) |
| ***G06N 3/094*** | (2023.01) |
| ***H04L 9/08*** | (2006.01) |
| ***H04L 41/04*** | (2022.01) |
| ***H04L 41/0897*** | (2022.01) |

(56) References Cited

U.S. PATENT DOCUMENTS

| | | | | |
|---|---|---|---|---|
| 11,470,181 | B2 | 10/2022 | Stockert et al. | |
| 11,475,276 | B1 * | 10/2022 | Shrivastava | G06N 3/045 |
| 12,363,146 | B2 * | 7/2025 | Brunner | H04L 63/1458 |
| 2018/0013662 | A1 * | 1/2018 | Salam | H04L 41/0226 |
| 2020/0329386 | A1 * | 10/2020 | Perez-Ramirez | H04L 41/16 |
| 2021/0092020 | A1 * | 3/2021 | Maguire | H04L 41/40 |
| 2022/0383198 | A1 * | 12/2022 | Liu | G06Q 10/0639 |
| 2023/0306203 | A1 * | 9/2023 | Hoang | G06F 40/30 |
| 2023/0308465 | A1 * | 9/2023 | Alroobaea | H04L 63/205 |
| 2024/0242482 | A1 * | 7/2024 | Lee | G06V 10/771 |
| 2024/0412047 | A1 * | 12/2024 | Patankar | G06N 3/045 |
| 2024/0419925 | A1 * | 12/2024 | Ben-Elazar | G09B 17/003 |
| 2025/0023779 | A1 * | 1/2025 | Sumedrea | H04L 41/0894 |
| 2025/0054288 | A1 * | 2/2025 | Liao | G06V 10/82 |
| 2025/0225328 | A1 * | 7/2025 | Chowdhury | G06F 40/30 |
| 2025/0348986 | A1 * | 11/2025 | Park | G06T 7/0002 |
| 2025/0356264 | A1 * | 11/2025 | Rahman | G06N 20/10 |
| 2025/0371139 | A1 * | 12/2025 | Yarabolu | G06F 21/552 |

OTHER PUBLICATIONS

Filiposka, S., Pantazatos, D., UoB, P. V., Fau, V. B., Perez, C. T., & Golub, I. Intelligent Networks: The Rise of Generative AI in Network Management. (Year: 2025).*

Grondman, Ivo , et al., "A survey of actor-critic reinforcement learning: standard and natural policy gradients", HAL Id: hal-00756747, Nov. 23, 2012, 18 Pages.

Qi, Jiaju , et al., "Federated Reinforcement Learning: Techniques, Applications, and Open Challenges", arXiv:2108.11887v2 [cs.LG], Oct. 24, 2021, 39 Pages.

* cited by examiner

210

220

200

600

SYSTEM AND METHODS FOR SELF-LEARNING MANAGEMENT OF NEXT GENERATION NETWORKS

FIELD OF THE DISCLOSURE

The subject disclosure relates to a system and methods for self-learning management of next generation networks.

BACKGROUND

Current fifth generation (5G) networks, expected sixth generation (6G) networks and succeeding generations of networks (so-called "next generation" networks) are inherently complex, massively scale, and are quite dynamic. These features impact the effectiveness of network monitoring, management, and optimization using traditional network probes. Some of the key challenges deploying and utilizing probes in next generation networks include:

- High Data Traffic: The increasing demand for high-speed data services has led to a surge in data traffic. This puts a strain on the network infrastructure, making it challenging to maintain optimal performance. Further, next generation network probes will generate massive volumes of data, which are increasing at a rapid rate. While current methods and tools can help filter this data, manual analysis and manual follow-up actions are still required.
- Latency: Despite the advancements in technology, latency remains a significant issue, especially in real-time applications where even a slight delay can have significant implications. Next generation networks are characterized by ultra-low latency and high reliability, especially for First Responder network applications, autonomous driving, and other applications. The ultra-low latency of next generation networks enables immediate processing and analysis of data from Internet of Things (IoT) devices, improving efficiency and functionality in smart homes, smart cities, health monitoring systems, and more. With next generation networks, virtual reality (VR) and augmented reality (AR) applications can process complex data in real-time, enhancing user experiences in gaming, interactive learning, virtual tours, and more. Real-time data processing in next generation networks can enhance cloud computing capabilities by allowing instantaneous access and modification of data stored in the cloud, driving productivity in various business applications. These technologies require high-speed data processing to deliver effective, seamless, and immersive experiences.
- Cost: Deploying and maintaining advanced probing systems for next generation networks is expensive. Widespread coverage, high resolution, probe network traffic processing and storage limit the deployment of probe systems.
- Security: As networks become more complex and interconnected, they also become more vulnerable to security threats. Ensuring the security of these networks is a major challenge.
- Energy Efficiency: With the increasing scale of networks, energy efficiency has become a critical concern. It is important to develop technologies that can provide high-speed connectivity while consuming less energy.
- Frequency Bands: The availability of frequency bands is limited, and there is a high demand for low-frequency resources to meet user experience rates. Improving the spectral efficiency of the system is a significant challenge.
- Dynamic Network Topologies: The dynamic nature of these networks, with users constantly moving and the number of devices fluctuating, adds to the complexity of network management. Additionally, with the advent of network slicing, next generation networks can dynamically create, modify, or delete network slices to accommodate different service requirements. The dynamic nature of slicing is a challenge for probing systems that need to monitor and adapt to changing network configurations and performance parameters. In addition, Virtual Network Functions (VNFs) may need to be spun-up or spun-down to adapt the network to dynamic, real-time traffic conditions.
- Scalability: As the number of devices connected to the network increases, so does the need for the network to scale efficiently. This is a major challenge given the expected growth in the number of IoT devices. Probing systems struggle to scale accordingly both in terms of handling ever larger data volumes and monitoring a wide range of devices, nodes, and services efficiently.
- Integration of Advanced Technologies: The integration of advanced technologies such as artificial intelligence (AI), machine learning (ML), and edge computing into the network infrastructure is a complex task that requires significant research and development. These technologies rely on substantial amounts of data to learn and make decisions. With next generation networks, AI/ML systems can process and analyze data in real-time, improving their ability to provide instant insights, predictions, and automated responses.

These challenges necessitate continuous research and development to improve the performance and efficiency of probes monitoring next generation networks. Furthermore, systems capable of providing insights and interpretations that are actionable for network operators are few. Interpretation of vast amounts of data generated by next generation networks often requires expert knowledge, which can limit the ability of non-specialist personnel to understand the implications of the data and take appropriate action. Additionally, the dynamic nature of next generation networks, coupled with the ever-evolving landscape of network threats and vulnerabilities, necessitates a system capable of learning and adapting to new patterns and anomalies in real-time.

Furthermore, the existing methods of network data analysis do not effectively leverage the potential of advanced AI techniques. AI has shown exceptional promise in various areas of technology, especially in data analysis and interpretation. However, applying AI in the context of next generation network management remains limited and unoptimized.

Finally, the feedback loop between the human operators and the system is often disjointed in current systems. Continuous improvement of the system based on human feedback is crucial for the system's adaptability and effectiveness. Lack of a proper mechanism for collecting and incorporating human feedback into the system limits potential improvements and adaptability of the system.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a self-learning management of next generation networks. Other embodiments are described in the subject disclosure.

One or more aspects of the subject disclosure include a system including: one or more probes in a communication network; a processing system including a processor; and a memory that stores executable instructions that, when executed by the processing system, facilitate performance of operations of: collecting data from the one or more probes and application program interfaces of network elements in the communication network; converting the data into semantic vectors using an embedding model; storing the semantic vectors in a vector database; using foundation models to generate outputs based on the semantic vectors; generating synthetic data using a generative adversarial network (GANS), wherein the synthetic data is used test the foundation models; using federated reinforcement to incorporate human feedback into the semantic vectors; and managing the communication network based on the outputs.

One or more aspects of the subject disclosure include a non-transitory machine-readable medium with executable instructions that, when executed by a processing system including a processor, facilitate performance of operations, including: collecting data from probes and network elements in a communication network; converting the data into semantic vectors using an embedding model; generating synthetic data using a generative adversarial network (GANS), wherein the synthetic data is used test foundation models; using the foundation models to generate outputs based on the semantic vectors; and managing the communication network based on the outputs.

One or more aspects of the subject disclosure include a method of: converting, by a processing system including a processor, data collected from probes and network elements in a communication network into semantic vectors using an embedding model; generating, by the processing system, synthetic data using a generative adversarial network (GANS) to train foundation models; generating, by the processing system, outputs based on the semantic vectors using the foundation models; and managing the communication network based on the outputs.

Figure 1:
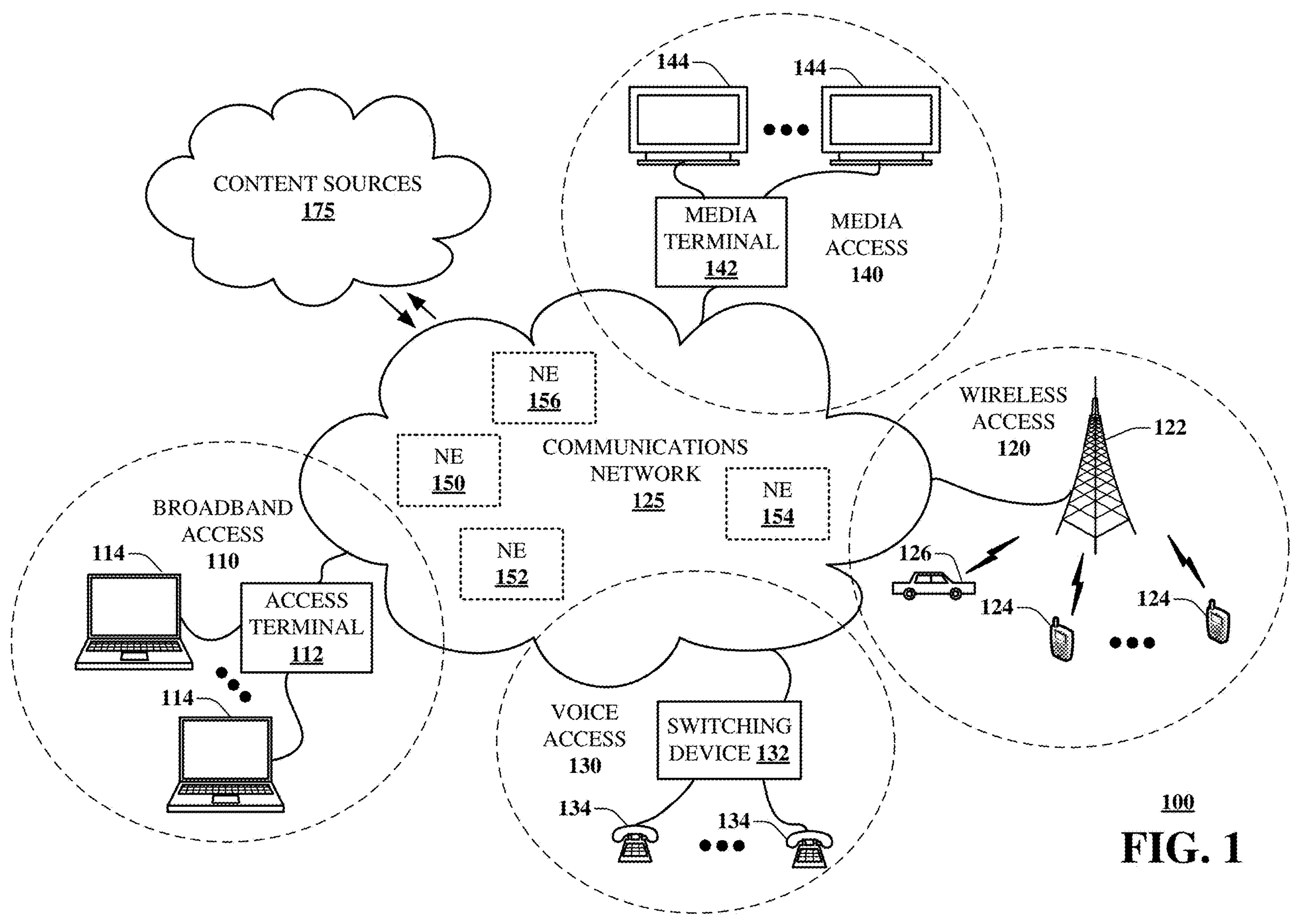
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part collecting data from probes and APIs; converting data into semantic vectors; storing semantic vectors in a vector database; incorporating human feedback into the semantic vectors; generating outputs based on the semantic vectors; and managing the communication network based on outputs. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
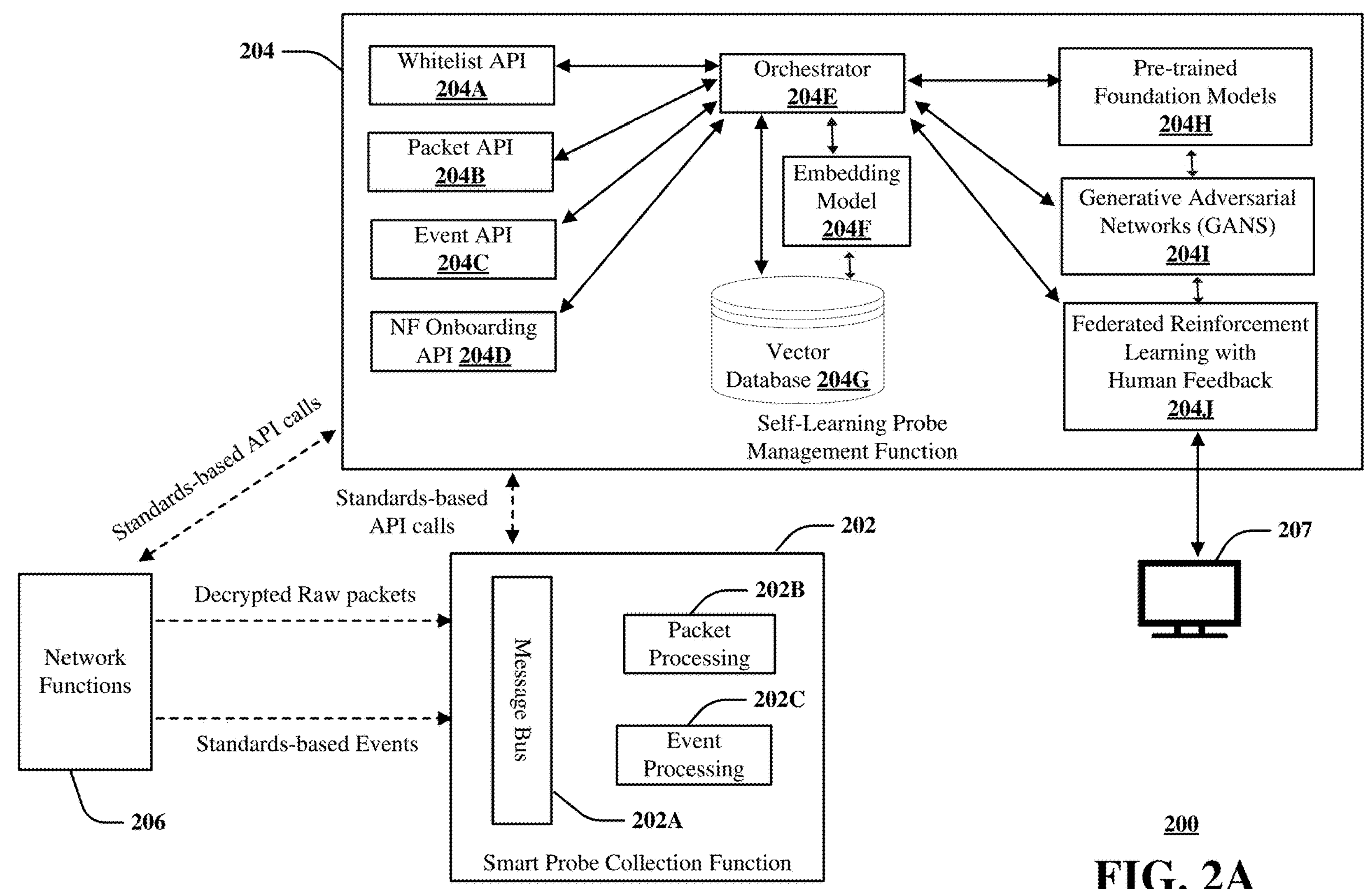
FIG. 2A is a block diagram illustrating an example, non-limiting embodiment of a system 200 that can function fully or partially within the communication network of FIG. 1 in accordance with various aspects described herein.

FIG. 2A is a block diagram illustrating an example, non-limiting embodiment of a system 200 that can function fully or partially within the communication network of FIG. 1 in accordance with various aspects described herein. More particularly, this figure shows a high-level view of system 200 that incorporates a Smart Probe Collection Function 202 and a Self-Learning Probe Management Function (PMF 204), both which interface with a Network Function (NF 206), according to an embodiment. Smart Probe Collection Function 202 is described in more detail in U.S. patent application Ser. No. 17/889,991, filed Aug. 17, 2022, entitled "Systems and Methods for On-Demand Cloud Interfaces Monitoring," which is incorporated by reference herein.

In an embodiment, system 200 replaces all manual identification and troubleshooting of issues in a communication network. In an embodiment, system 200 has the ability to create filters and query data from probe repositories. System 200 reflects on itself and self-learns how much probing and tracing is required to troubleshoot and identify issues in the network. System 200 incorporates vector databases for efficient Generative AI vector storage and retrieval. System 200 incorporates AI to learn, adapt, and make sense of substantial amounts of data, and plays a crucial role in enhancing the efficiency and effectiveness of next generation network management. Feedback from human operators 207 is collected and used to improve the performance of system 200 over time. The benefits provided by system 200 include probing networks on-demand, thereby saving infrastructure and cost, monitoring relevant data as opposed to monitoring everything, proactively identifying issues in the network, providing relevant data for issues identified, providing relevant data for scenarios that require further investigation, and personalizing data gathering and tracing based on service type.

Still referring to FIG. 2A, it is seen that Smart Probe Collection Function 202 is in bi-directional communication with PMF 204 (the communication between Smart Probe Collection Function 202 and PMF 204 can be via various standards-based Application Programming Interface (API) calls. Further, it is seen that PMF 204 is in bi-directional communication with NF 206 (the communication between PMF 204 and NF 206 can be via various standards-based API calls. Further still, it is seen that NF 206 can provide to Smart Probe Collection Function 202 various data. For example, NF 206 can provide to Smart Probe Collection Function 202 the following: (a) decrypted raw packets, i.e., packet capture (pcap) and/or packet capture next generation (pcap-ng); (b) one or more Standards-based Events; and/or (c) any combination thereof. NF 206 can comprise an access control and mobility management function (AMF), a session management function (SMF), a data service management function, any 3GPP defined network function of next generation networks, or any combination thereof.

Still referring to FIG. 2A, PMF 204 can request and/or command (such as via one or more standards-based API calls) NF 206 to provide certain data to Smart Probe Collection Function 202. In response to the request (or command) from PMF 204 to provide certain data, NF 206 provides such data to Smart Probe Collection Function 202. The data can be provided to Smart Probe Collection Function 202 at Message Bus 202A. Further, once the data is received by Smart Probe Collection Function 202, the data can undergo Packet Processing 202B and/or Event Processing 202C. In addition, Smart Probe Collection Function 202 can send processed data for storage. In one example, NF 206 must send the data requested/commanded by PMF 204. In one example, NF 206 will only send the data requested/commanded by PMF 204 if sending of such data is permitted by a policy (e.g., an internal policy) applicable to NF 206.

Still referring to FIG. 2A, in one example, the standards-based API calls used between PMF 204 and Smart Probe Collection Function 202 can be the same as the standards-based API calls used between PMF 204 and NF 206. In another example, the standards-based API calls used between PMF 204 and Smart Probe Collection Function 202 can be different from the standards-based API calls used between PMF 204 and NF 206. In another example, the standards-based API calls used between PMF 204 and Smart Probe Collection Function 202 can be a superset of the standards-based API calls used between PMF 204 and NF 206. In another example, the standards-based API calls used between PMF 204 and Smart Probe Collection Function 202 can be a subset of the standards-based API calls used between PMF 204 and NF 206.

In an embodiment, PMF 204 incorporates post-quantum cryptography to transmit and secure data. One-Way Functions that are easy to compute in one direction but extremely difficult to reverse (lattice-based, multivariate, hash-based, code-based and elliptic curve), can be employed; however, such functions cannot prove definitively secure against quantum computer attacks. Quantum Key Distribution (QKD) protocols and cryptosystems based on physical properties at the quantum level may also be used. Further, PMF 204 may use any combination of QKD, One-Way functions, and Quantum Random Number Generators to secure data.

Still referring to FIG. 2A, PMF 204 comprises a variety of elements including: a Whitelist API 204A; a Packet API 204B; an Event API 204C; an NF Onboarding API 204D; an Orchestrator 204E; an Embedding Model 204F; a Vector Database 204G; Pre-trained Foundation Models 204H; Generative Adversarial Networks (GANS 2041); and Federated Reinforcement Learning with Human Feedback (RLHF 204J). PMF 204 identifies network issues and provides the appropriate data necessary to trace issues, make closed loop decisions on data retention, level of data to be monitored, what areas of the network to monitor, etc. PMF 204 helps identify potential network issues and performance metrics, supporting informed decision-making for network maintenance and upgrades. Orchestrator 204E is a central management system that coordinates interactions between various specialized components of PMF 204. Orchestrator 204E interfaces with Whitelist API 204A; a Packet API 204B; an Event API 204C; an NF Onboarding API 204D, Vector Database 204G, Embedding Model 204F, Pre-trained Foundation Models 204H, GANS 2041 and RLHF 204J components. Orchestrator 204E serves a pivotal role in streamlining processes, managing data flow, creating virtual resources and ensuring each components operates harmoniously within the larger framework. Orchestrator 204E primarily facilitates data exchange among PMF 204 components, thus enabling efficient execution of tasks that require the integration of several types of AI technologies. Orchestrator 204E also can request and/or command the communication network to dynamically create virtual resources to support network requirements.

PMF 204 may perform certain operations, which will now be discussed. As mentioned above, PMF 204 can request and/or command (such as via one or more standards-based API calls) NF 206 to provide certain data to Smart Probe Collection Function 202. In addition, when PMF 204 requests and/or commands NF 206 to provide the data to Smart Probe Collection Function 202, PMF 204 can inform (such as via one or more standards-based API calls) Smart Probe Collection Function 202 to expect the data from NF 206. In various examples, PMF 204 can request and/or command NF 206 via one or more of: (a) Whitelist API 204A (which can provide instructions to NF 206 as to which source(s) to include when sending data); (b) Packet API 204B (which can provide instructions to NF 206 as to which packet(s) to include when sending data); (c) Event API 204C (which can provide instructions to NF 206 as to which events(s) to include when sending data); (d) NF Onboarding API 204D (which can provide instructions to one or more particular Network Functions); or (c) any combination thereof. Data from these APIs is tokenized and converted to semantic vectors. Embedding Model 204F converts API provided data to semantic vectors and stores the vectors in Vector Database 204G.

Orchestrator 204E handles tasks such as initiating data retrieval from APIs, managing the storage and retrieval of data within the Vector Database 204G, and ensuring that data is correctly formatted and presented to the Embedding Model 204F for processing. It is also responsible for coordinating with the Pre-trained Foundation Models 204H and GANS 2041 for tasks that require advanced pattern recognition, generation of new data samples or complex decision-making processes. Additionally, by interfacing with a RLHF 204J, orchestrator 204E can oversee learning processes that occur across multiple nodes or systems, aggregating knowledge without compromising the autonomy or privacy of subscribers. Orchestrator 204E is crucial for maintaining efficiency, scalability, and flexibility of the PMF 204.

Orchestrator 204E converts preprocessed/tokenized data to a format for training Pre-trained Foundation Models 204H. This requires converting the data to a numerical tensor which is then inputted to the model for training. Deep learning Generative Pre-training Transformer (GPT) models (familiar to those skilled in the art) partition the data to smaller chunks such as sequences of information that can be processed in parallel to vastly speed up the training process. Pre-trained Foundation Models 204H can be fine-tuned on a smaller, task-specific dataset to improve their performance. Fine-tuning involves adjusting the model parameters to minimize the loss function on the smaller dataset. Performance of the Pre-trained Foundation Models 204H can be evaluated on a validation set, which is a portion of training data set aside for evaluation purposes. Evaluation metrics such as accuracy, precision, recall, Fl scores or other metrics are used to compare performance of Pre-trained Foundation Models 204H and choose the best model for the specific task.

In an embodiment, human feedback is incorporated into the training process to align Pre-trained Foundation Models 204H outputs with user intent through the process of Supervised Fine-Tuning (SFT) which adapts a model to a specific domain by fine-tuning model parameters with a labeled dataset. In this embodiment the domain is Network Function KPIs, events, messages, probe packets and other network data. Pre-trained weights of the model are used as initial values and then updated with backpropagation on the fine-tuning dataset. This allows the model to learn task-specific features while still retaining general knowledge acquired during pre-training.

GANS 2041 are a type of deep learning model used for unsupervised learning, particularly for generating new, synthetic data samples and data sets that are like existing datasets. They consist of two main components: a generator and a discriminator. The generator creates new data samples, while the discriminator evaluates these samples and determines whether they are real (from the original dataset) or fake (generated by the generator). The generator and discriminator are trained simultaneously, with the generator trying to create samples that can fool the discriminator, and the discriminator trying to correctly identify real vs fake samples. This adversarial process continues until the generator produces high-quality synthetic samples that are indistinguishable from real ones, and the discriminator is unable to identify them as fake. The trained generator can then be used to generate new samples on demand.

Figure 2B:
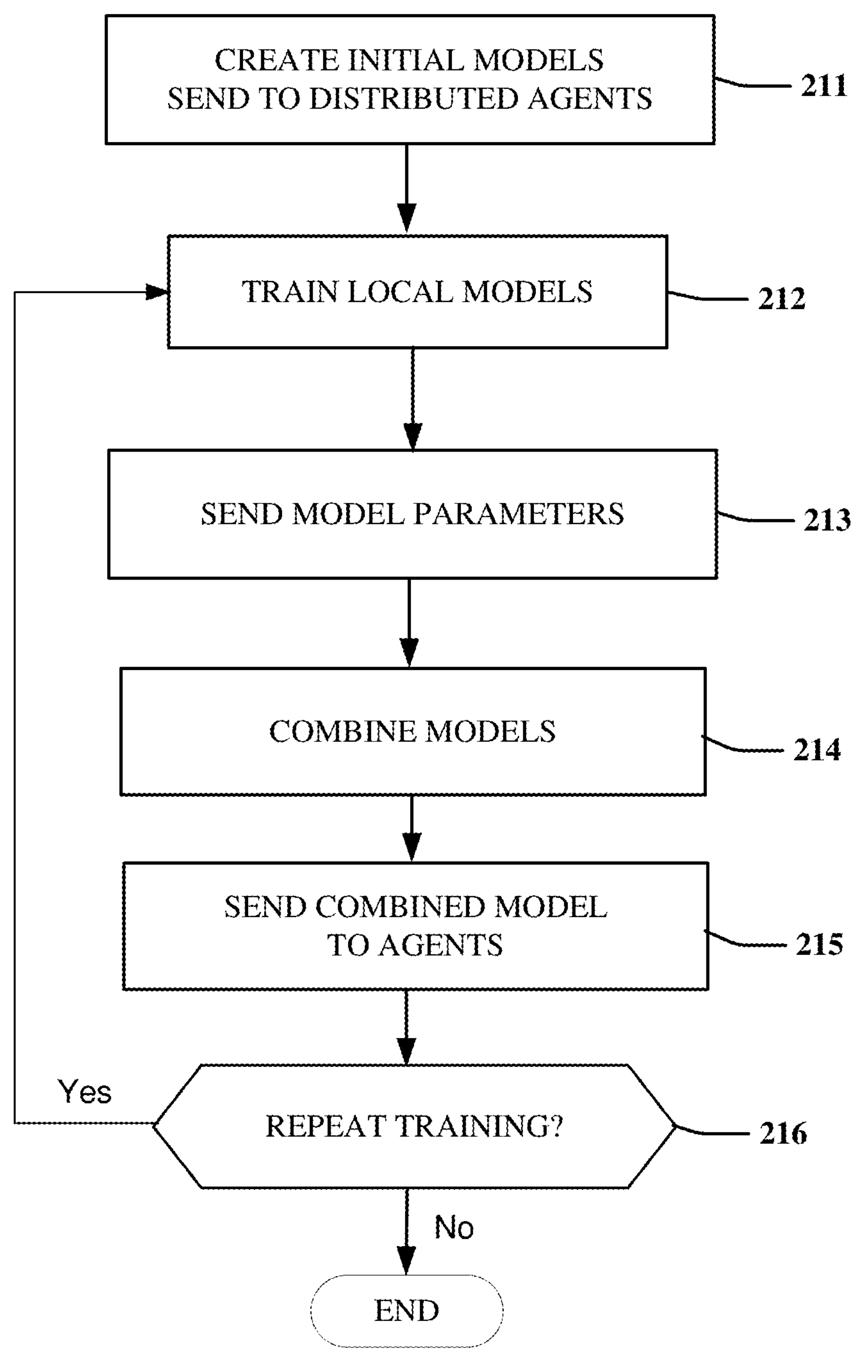
FIG. 2B depicts an illustrative embodiment of a reinforced learning method in accordance with various aspects described herein.

FIG. 2B depicts an illustrative embodiment of a reinforced learning method in accordance with various aspects described herein. RLHF 204J performs a decentralized, collaborative RL method whereby multiple, distributed agents train on local data, that is not distributed or shared, and build a shared, centrally orchestrated model while maintaining privacy. RLHF 204J follows the steps of method 210 illustrated in FIG. 2B.

In step 211, a global coordinator creates an initial model and sends it to each distributed agent to set up a client-server-based learning system. Agents which are created or join later can access the latest global model. Next in step 212, each agent trains a local model based on their own dataset.

Next, in step 213 the agents send updates of model parameters to the global controller. Then in step 214, the global controller combines the model updates using aggregation algorithms. Next, in step 215, the global controller sends the combined model back to the distributed agents.

Finally in step 216, the system checks whether the model converges, or maximum number of iterations have been reached. If not, then the process repeats at step 212. Otherwise, the process ends.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
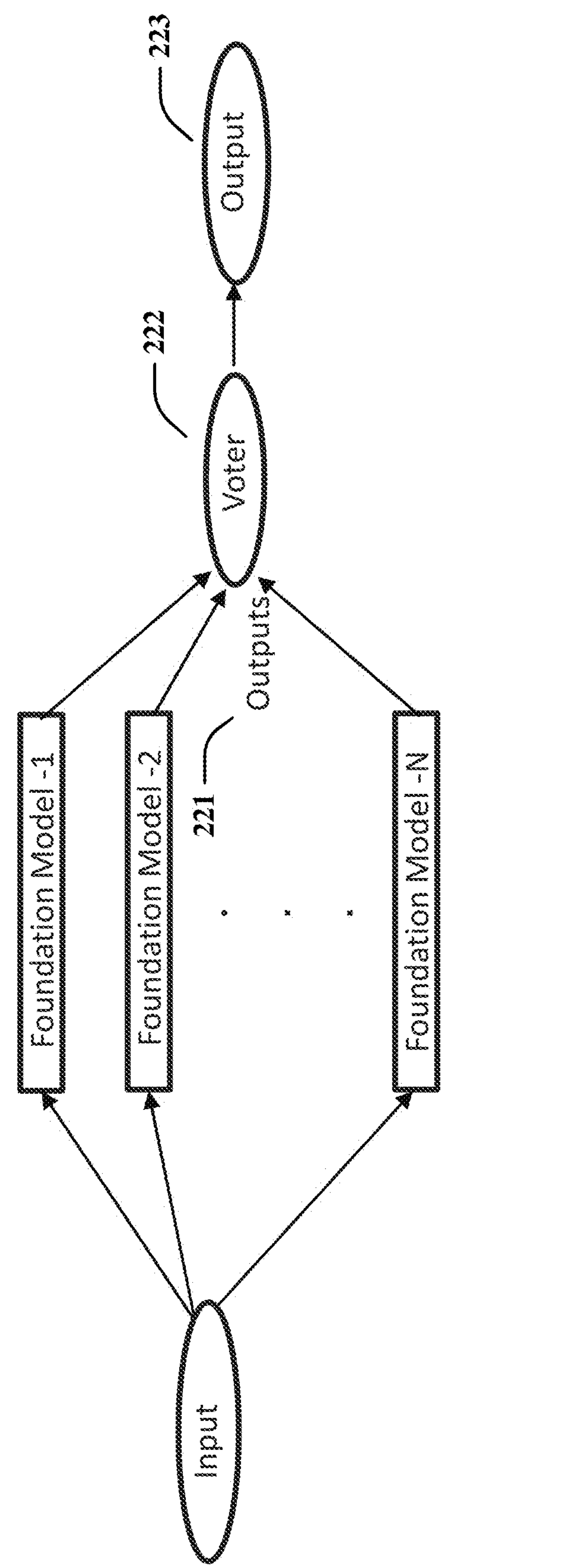
FIG. 2C is a block diagram illustrating an example, non-limiting embodiment of an N-Voting Foundation Model ensemble in accordance with various aspects described herein.

FIG. 2C is a block diagram illustrating an example, non-limiting embodiment of an N-Voting Foundation Model ensemble 220 in accordance with various aspects described herein. In an embodiment, a voting mechanism (voter 222), also known as N-majority voting, can be applied to combine and rank the responses generated by a set of N ensembled Pre-trained Foundation Models 204H, as illustrated in FIG. 2C. In an embodiment, the process develops and/or tunes several Foundation Models in ensemble 220 with different architectures, hyperparameters, and/or training data. This creates a diverse set of models that can capture distinct aspects of the problem. The system analyzes the input data to determine its context, complexity, and/or domain. This information will be used to select appropriate inputs and weights for ensemble 220.

For a given foundation model input, the system generates candidate responses from each of the trained models. This can be done by sampling multiple responses from each model or using techniques like beam search to find the most likely responses. The system assesses the quality of each candidate response using a scoring function. This function can be based on numerous factors, such as the likelihood of the response given the input, the coherence of the response, or the relevance to the context.

The system maintains a pool of candidate responses and uses reinforcement learning to select a subset of N responses based on the context analysis. The selected responses will be more likely to generate relevant and accurate responses for the given context. These responses are passed as input responses to the set of Foundation Models. The model(s) will generate an output response for each input.

In an embodiment, each of the N outputs 221 from a foundation model is given to a voter 222, and the final output 223 is determined by the responses that receive the most votes from the voting mechanism. In an embodiment, the system selects the top candidate responses based on their probabilistic confidence scores. For each generated response, the system counts the number of "votes" received based on its similarity or consistency with other responses. Various similarity measures, such as cosine similarity, Jaccard similarity, or simple string matching, may be used to determine if two responses are similar enough to be considered "votes" for the same output. Next, the system identifies the response (or group of similar responses) with the highest number of votes and selects it as the final output 223. This response represents the majority opinion of the model based on the different prompts and is selected as the final output. Note that multiple cycles of voting may be done with error injection to fine tune the n-voting model. Then, the voter 222 combines these responses into a final output of the ensemble 220. This can be done using simple majority voting, weighted voting based on the scores, or more advanced techniques like rank aggregation.

In an embodiment, orchestrator 204E directs the communication network to dynamically provide virtual resources for ultra-low latency and high reliability communications requirements in applications including first responders, autonomous driving and remote healthcare procedures. Orchestrator 204E may create virtual resources in the communications network to provide ultra-low latency for immediate processing and analysis of data provided by Internet of Things (IoT) devices. Orchestrator 204E may create virtual resources in the communications network to provide seamless, immersive experiences for virtual and augmented reality applications including gaming, interactive learning and virtual tours.

In an embodiment, the system collects user feedback or uses a predefined evaluation metric to assess the quality of the generated output. The system updates the reinforcement learning model based on this feedback to improve selection and weighting in future iterations.

In an embodiment, the system periodically retrains the reinforcement learning model and updates the pool of candidates based on emerging trends and patterns in the data. N-voting in the context of model ensembles increases the likelihood of generating accurate and consistent responses, as the majority opinion of the model is more likely to capture the correct answer or relevant information. This method can be particularly useful for mitigating the variability in responses generated by Pre-Trained Foundation Models 204H, which can produce different outputs depending on the inputs.

In another embodiment, Pre-trained Foundation Models 204H can be applied to next generation network slicing to enhance management and monitoring capabilities. Network slicing is a key feature of next generation networks that allows the creation of multiple virtual networks on top of a shared physical infrastructure. Each virtual network, or slice, can be tailored to specific use cases or services, such as IoT, autonomous vehicles, or emergency services in wide area disasters. Some applications of summarization provided by Pre-trained Foundation Models 204H include:

Slice performance monitoring: Summarization can help condense the vast amount of data generated by each network slice into a manageable subset of key performance indicators (KPIs). This can enable network operators to quickly assess the performance of individual slices and ensure that they meet the desired service level agreements (SLAs).

Resource allocation and optimization: By summarizing resource usage and allocation data across all network slices, operators can identify trends, inefficiencies, and opportunities for optimization. This can lead to better resource allocation decisions, improving overall network performance and meeting the specific requirements of each slice.

Traffic analysis: Summarizing traffic patterns within and between network slices can help operators identify potential bottlenecks, congestion points, or security risks. This information can be used to optimize routing, load balancing, and slice configuration to ensure smooth and secure operation. In an embodiment, summarizing traffic patterns within and between network slices, Pre-trained Foundation Models 204H can identify security risks, such as anomalies, intrusion, segmentation, malware, and analysis of security incidents. Summarization techniques can help detect anomalies in traffic patterns, such as sudden spikes in data transfer, repeated connection attempts, or unusual traffic volumes. These anomalies could signal potential security threats like Distributed Denial of Service (DDOS) attacks, intrusion attempts, or data exfiltration. Summarizing network traffic allows operators to assess the flow of data within and between slices, identifying potential risks associated with data leakage or unauthorized data access. This can help operators implement appropriate security measures, such as encryption or strict access controls, to safeguard sensitive data. Summarizing network traffic can enable operators to monitor connection patterns between slices and identify suspicious activities, such as unauthorized access attempts or unexpected cross-slice communication. Early detection of such activities can help operators respond promptly and prevent potential intrusions or data breaches. By analyzing summarized traffic patterns, network operators can identify the need for further network segmentation or isolation between slices, ensuring that sensitive data and critical services are protected from unauthorized access or potential threats originating from other slices. Summarized traffic data can reveal patterns indicative of malware or botnet activity, such as frequent communication with known command and control servers or many connections to specific external IP addresses. Identifying these patterns can help operators respond appropriately to mitigate the risks posed by malware or botnets. Summarized traffic data can be invaluable for incident response and forensic analysis in the event of a security breach. By providing a high-level overview of network activity, it can help operators pinpoint the source and scope of a security incident, enabling them to respond effectively and minimize potential damage.

Network planning and expansion: Summarizing historical data on network slice usage and performance can provide insights into trends and growth patterns. This information can be used to inform future network planning and expansion decisions, ensuring that network slices continue to meet the evolving needs of users and services.

In summary, applying summarization techniques to network slicing can enhance its management and monitoring capabilities, leading to better resource allocation, improved performance monitoring, and more informed decision-making. By efficiently handling and analyzing substantial amounts of data generated by network slices, operators can optimize their networks to better serve the diverse needs of various use cases and services.

Figure 2D:
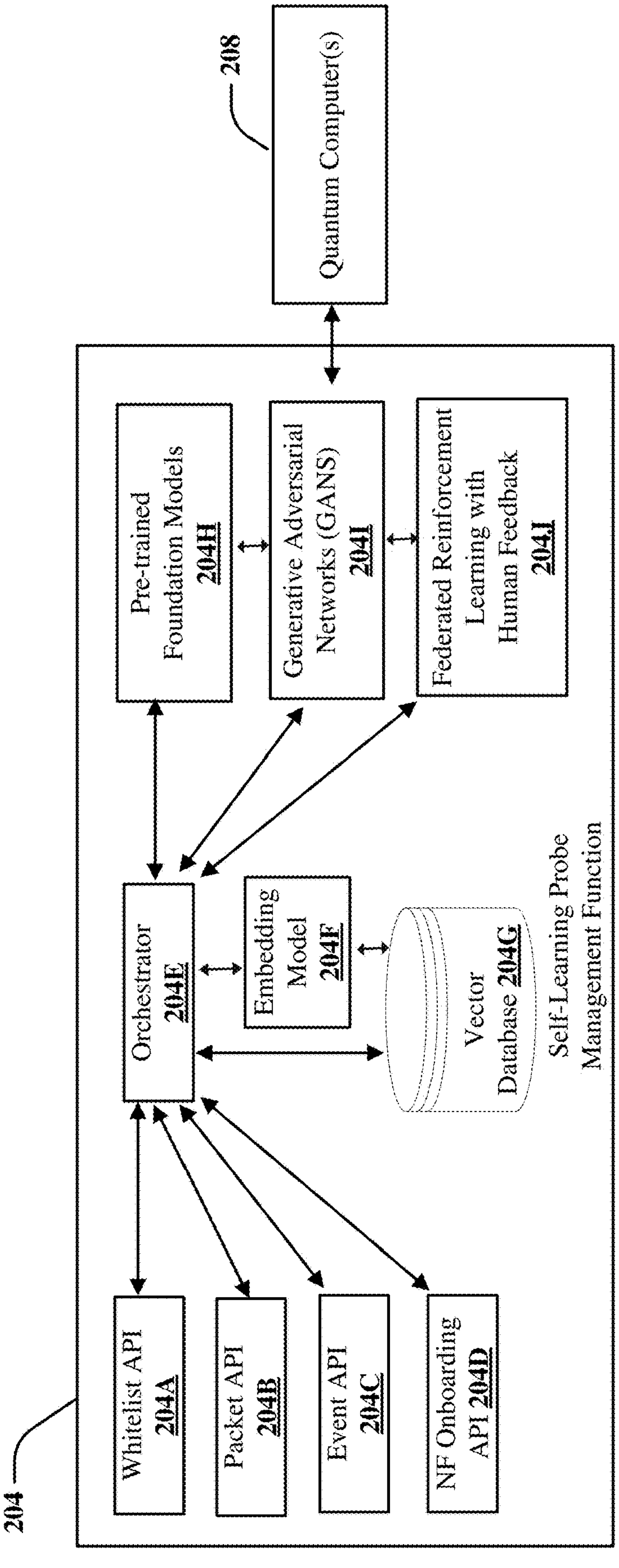
FIG. 2D is a block diagram illustrating an example, non-limiting embodiment of system including quantum computers in accordance with various aspects described herein.

FIG. 2D is a block diagram illustrating an example, non-limiting embodiment of system 200 including quantum computers in accordance with various aspects described herein. More particularly, FIG. 2D shows a high-level view of PMF 204 comprising GANS 2041 that interfaces with one or more quantum computers 208. In an embodiment, GANS 204I uses quantum computers 208 to solve chaos testing problems faster and more accurately. Chaos testing is a method of testing software systems and applications to determine their resilience and robustness in the face of unexpected events, failures, and anomalies. The goal of chaos testing is to identify and address potential weaknesses and vulnerabilities in a system before introduction into live networks. The optimization of chaos test scenarios can be challenging due to the high dimensionality of the problem. Quantum-classical computation has the potential to provide more accurate results than classical computers due to the use of quantum algorithms and quantum parallelism. This leads to more accurate and reliable results in chaos testing.

In an embodiment, Quantum-Classical chaos testing would be used to evaluate the performance of the network in scenarios that simulate real-world conditions, such as network congestion, hardware failures, software failures and other untoward events. The chaos testing determines how well the network can handle these types of challenges and recover from them in a graceful manner, without impacting QoS provided by the network. Chaos testing would assess the network's ability to handle a wide range of adverse conditions, including conditions from GANS, and to identify areas for improvement. This information would also be used to make adjustments and improvements to the network design and implementation to ensure that it can provide reliable and robust service in real-world scenarios.

Figure 2E:
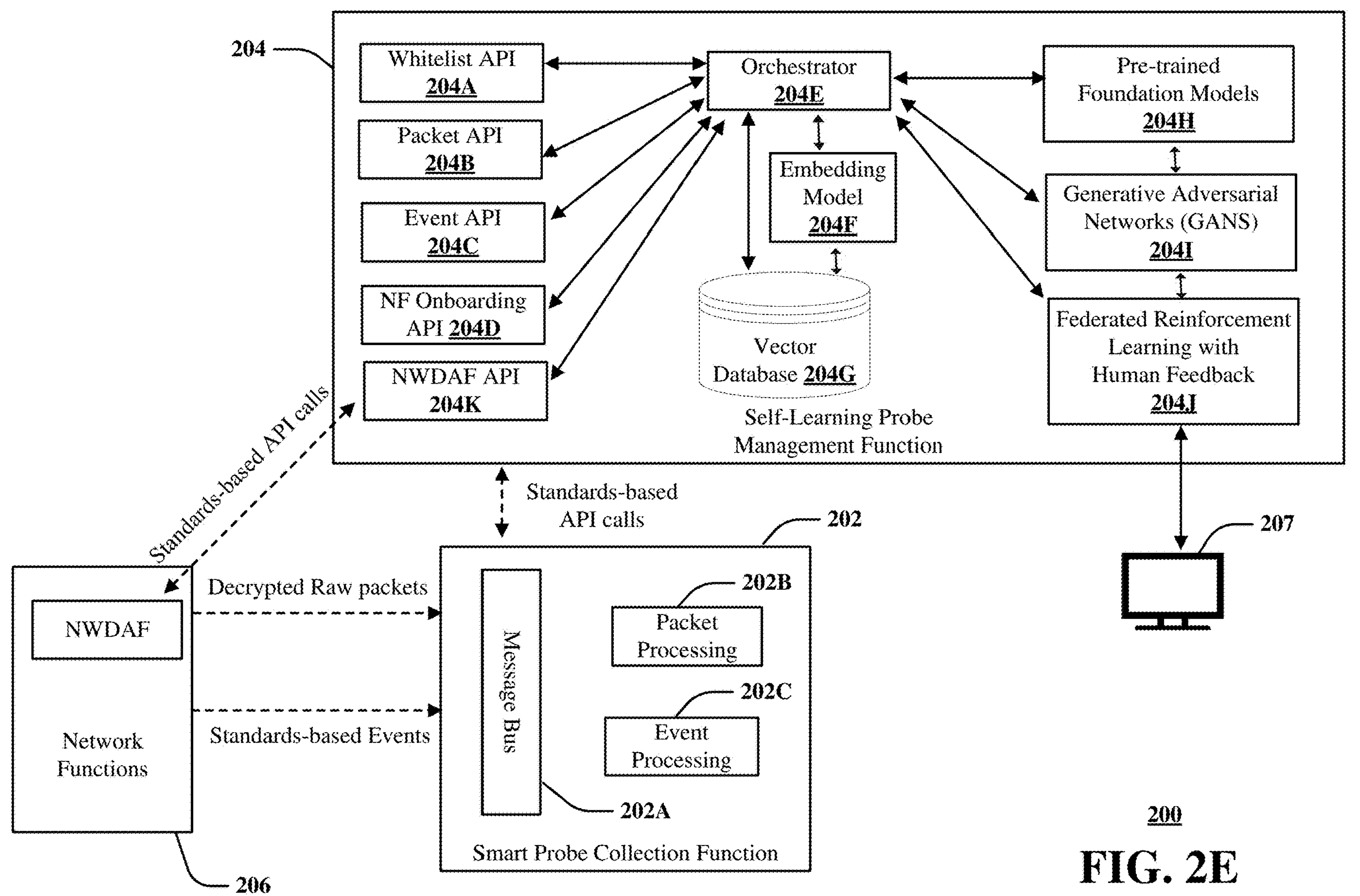
FIG. 2E is a block diagram illustrating an example, non-limiting embodiment of system comprising a network data analytics interface in accordance with various aspects described herein.

FIG. 2E is a block diagram illustrating an example, non-limiting embodiment of system 200 including PMF 204 comprising a network data analytics interface in accordance with various aspects described herein. As shown in FIG. 2E, a connection between PMF 204 and Network Function 206 enables PMF 204 to request and receive analytics data through interface NWDAF 204K from the Network Data Analytics Function (NWDAF), which is a component of the 5G core network defined by the 3GPP standards. NWDAF is designed to support the collection and analysis of data from various network functions (NFs) for the purpose of network optimization, anomaly detection, and the provisioning of analytics services to other NFs. NWDAF provides information about network congestion, device mobility patterns, service usage trends, and quality of service (QOS) metrics. PMF 204 can use this data to make informed decisions about how to manage the components it controls, such as dynamically adjusting the behavior of AI models based on current network conditions or optimizing data flow between components to ensure optimal performance in the following areas:

Dynamic Adaptation: With real-time insights from the NWDAF, the orchestrator can dynamically adjust the behavior of AI components, such as scaling resources, prioritizing tasks, or selecting the most efficient algorithms based on current network conditions. This ensures that AI-driven applications maintain high performance and responsiveness, even in changing network environments.

Optimized Resource Allocation: By understanding network conditions and user behavior, the orchestrator can optimize the allocation of computational and network resources among the components it manages. For example, it could prioritize bandwidth for critical data exchanges or allocate more processing power to components requiring intensive computation.

Predictive Analytics: Leveraging historical and real-time data from the NWDAF, the orchestrator could implement predictive analytics to forecast future network conditions or user behavior. This foresight allows for adjustments in the system, minimizing potential disruptions and enhancing user experience.

Enhanced Security and Privacy: With insights into network anomalies or potential security threats from the NWDAF, the orchestrator can enhance the security measures of the components it oversees, adjusting protocols and introducing safeguards in real-time to protect against emerging threats.

Service Customization and Personalization: Understanding user behavior and service usage patterns enables the orchestrator to customize and personalize AI-driven services at an individual level, improving user satisfaction and engagement.

Figure 3:
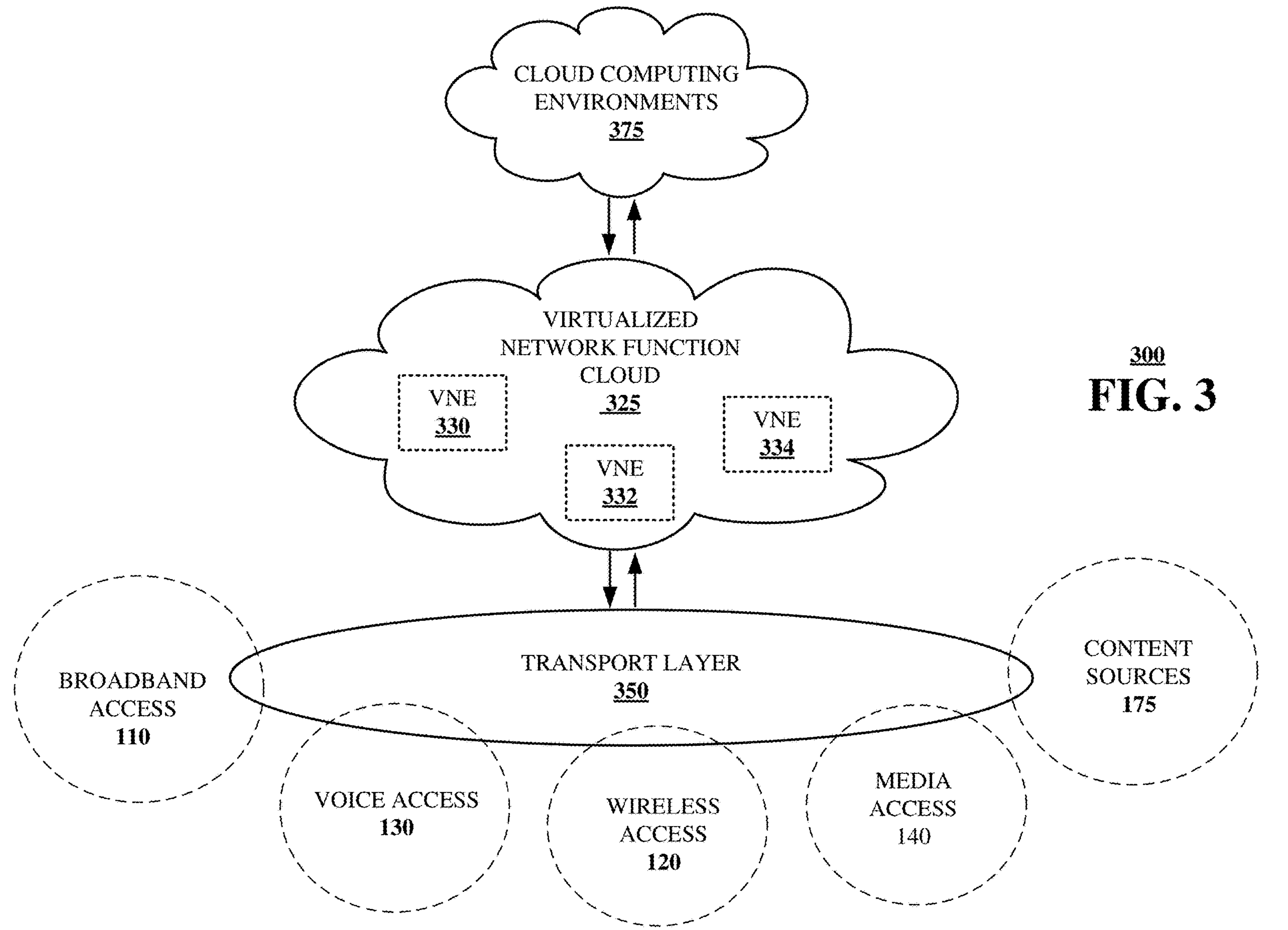
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network in accordance with various aspects described herein. In particular a virtualized communication network 300 is presented that can be used to implement some or all of the subsystems and functions of system 100, the subsystems and functions of system 200, and method 210 presented in FIGS. 1, 2A, 2B, 2C, 2D, 2E and 3. For example, virtualized communication network 300 can facilitate in whole or in part collecting data from probes and APIs; converting data into semantic vectors; storing semantic vectors in a vector database; incorporating human feedback into the semantic vectors; generating outputs based on the semantic vectors; and managing the communication network based on outputs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
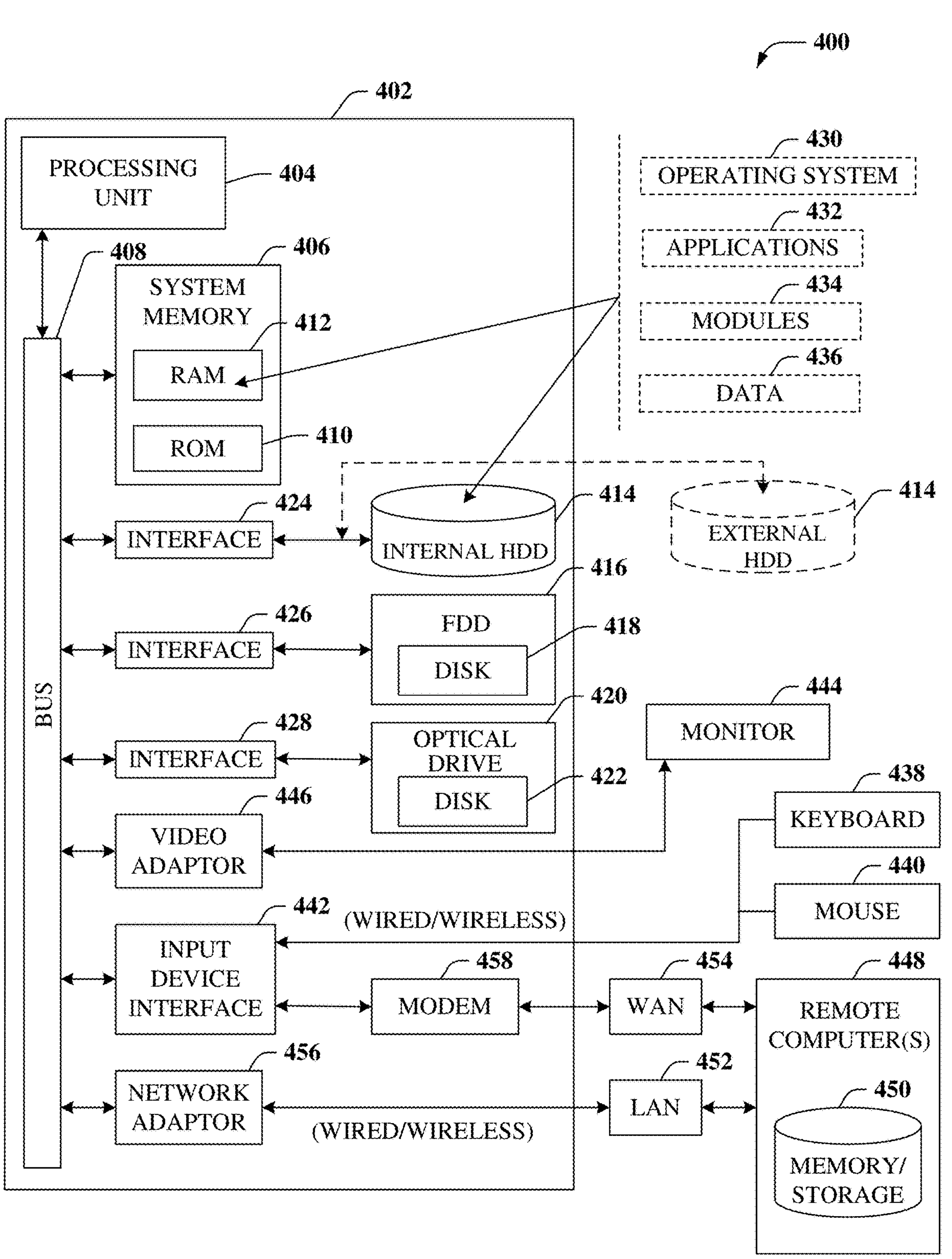
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 suitable for implementing the various embodiments of the subject disclosure. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting data from probes and APIs; converting data into semantic vectors; storing semantic vectors in a vector database; incorporating human feedback into the semantic vectors; generating outputs based on the semantic vectors; and managing the communication network based on outputs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
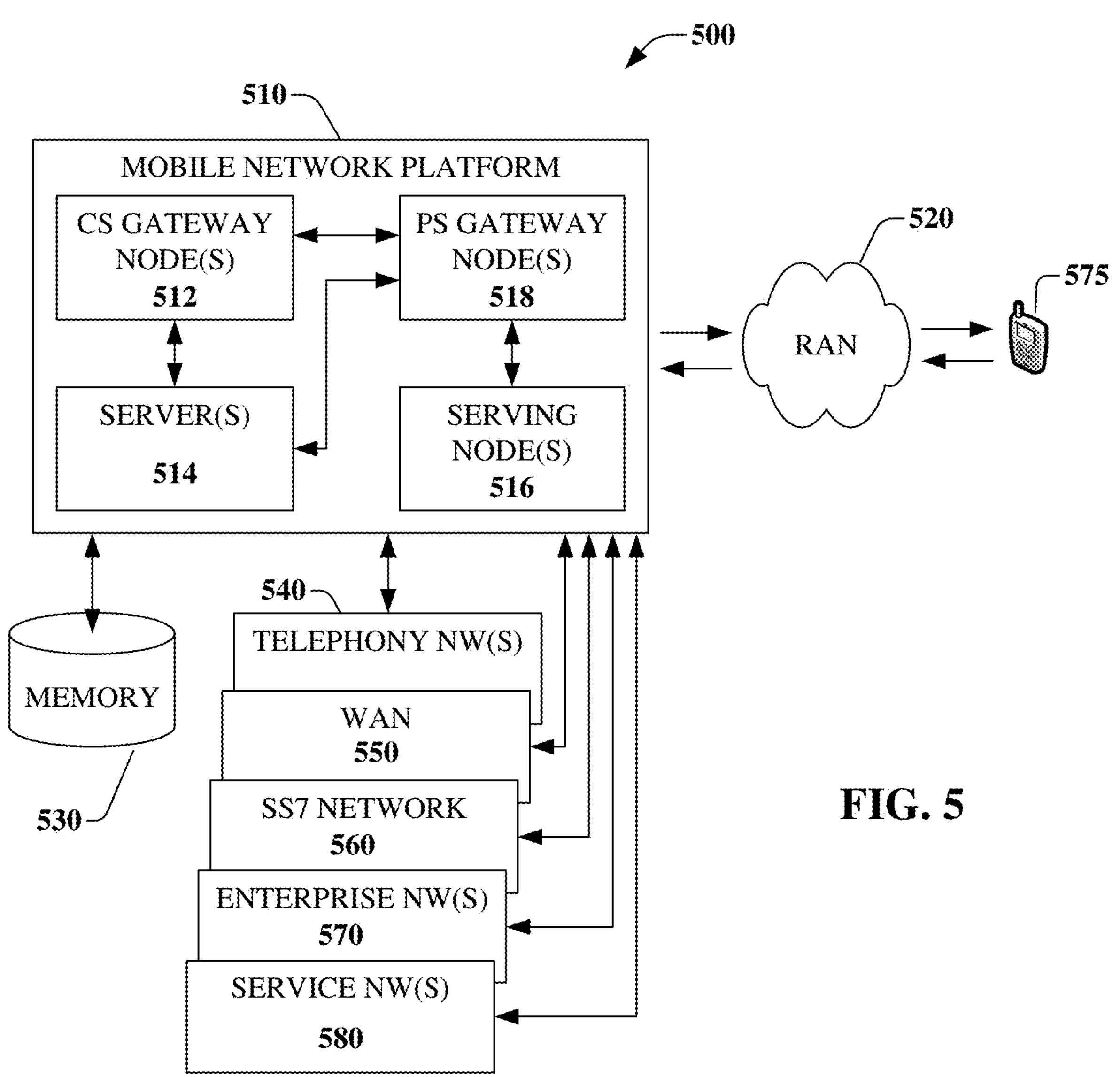
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, mobile network platform 510 can facilitate in whole or in part collecting data from probes and APIs; converting data into semantic vectors; storing semantic vectors in a vector database; incorporating human feedback into the semantic vectors; generating outputs based on the semantic vectors; and managing the communication network based on outputs. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
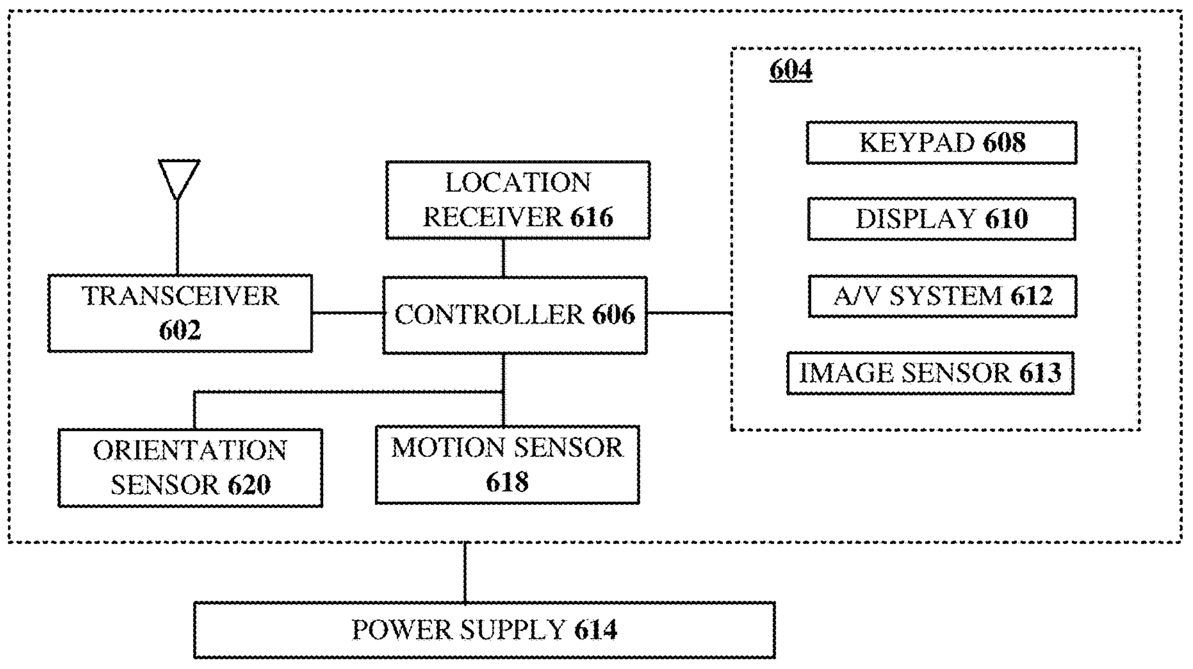
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part collecting data from probes and APIs; converting data into semantic vectors; storing semantic vectors in a vector database; incorporating human feedback into the semantic vectors; generating outputs based on the semantic vectors; and managing the communication network based on outputs.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system comprising:

one or more probes in a communication network;

a processing system including a processor; and a memory that stores executable instructions that, when executed by the processing system, facilitate performance of operations, the operations comprising:

collecting data from the one or more probes and application program interfaces of network elements in the communication network;

converting the data into semantic vectors using an embedding model;

storing the semantic vectors in a vector database;

using foundation models to generate outputs based on the semantic vectors;

generating synthetic data using a generative adversarial network (GANS), wherein the synthetic data is used to test the foundation models;

using federated reinforcement to incorporate human feedback into the semantic vectors; and managing the communication network based on the outputs.

2. The system of claim 1, wherein the foundation models are pre-trained.

3. The system of claim 1, wherein the managing comprises onboarding network functions and scaling virtual resources based on network traffic.

4. The system of claim 1, wherein the managing comprises providing virtual resources for ultra-low latency and high reliability communications requirements in applications including first responders, autonomous driving and remote healthcare procedures.

5. The system of claim 1, wherein the managing comprises creating virtual resources in the communications network to provide ultra-low latency for immediate processing and analysis of data provided by Internet of Things devices.

6. The system of claim 1, wherein the managing comprises creating virtual resources in the communications network to provide seamless, immersive experiences for virtual and augmented reality applications including gaming, interactive learning and virtual tours.

7. The system of claim 1, wherein the managing comprises applying summarization techniques to network slicing.

8. The system of claim 1, wherein the system secures the data and the semantic vectors using quantum cryptography and quantum key distribution.

9. The system of claim 1, wherein the operations further comprise using a voting mechanism to determine scores for the outputs from the foundation models.

10. The system of claim 1, wherein the GANS interfaces with a quantum computer to speed up generating of the synthetic data.

11. The system of claim 1, wherein the communications network comprises a wireless network, a wired network, or any combination thereof.

12. A non-transitory machine-readable medium, comprising executable instructions that, when executed by a processing system including a processor, facilitate performance of operations, the operations comprising:

collecting data from probes and network elements in a communication network;

converting the data into semantic vectors using an embedding model;

generating synthetic data using a generative adversarial network (GANS), wherein the synthetic data is used to test foundation models;

using the foundation models to generate outputs based on the semantic vectors;

using federated reinforcement to incorporate human feedback into the semantic vectors; and managing the communication network based on the outputs.

13. The non-transitory machine-readable medium of claim 12, wherein the managing comprises onboarding network functions and scaling virtual resources based on network traffic.

14. The non-transitory machine-readable medium of claim 12, wherein the managing comprises providing virtual resources for ultra-low latency and high reliability communications requirements in applications including first responders, autonomous driving and remote healthcare procedures.

15. The non-transitory machine-readable medium of claim 12, wherein the managing comprises creating virtual resources in the communications network to provide ultra-low latency for immediate processing and analysis of data provided by Internet of Things devices.

16. The non-transitory machine-readable medium of claim 12, wherein the managing comprises creating virtual resources in the communications network to provide seamless, immersive experiences for virtual and augmented reality applications including gaming, interactive learning and virtual tours.

17. The non-transitory machine-readable medium of claim 12, wherein the managing comprises applying summarization techniques to network slicing.

18. The system of claim 1, wherein the operations further comprise securing the data and the semantic vectors using quantum cryptography and quantum key distribution.

19. A method, comprising:

converting, by a processing system including a processor, data collected from probes and network elements in a communication network into semantic vectors using an embedding model;

generating, by the processing system, synthetic data using a generative adversarial network (GANS) to train foundation models;

generating, by the processing system, outputs based on the semantic vectors using the foundation models;

using, by the processing system, federated reinforcement to incorporate human feedback into the semantic vectors; and managing the communication network based on the outputs.

20. The method of claim 19, wherein the managing comprises onboarding network functions and scaling virtual resources based on network traffic, providing the virtual resources for ultra-low latency and high reliability communications requirements in applications including first responders, autonomous driving and remote healthcare procedures, immediate processing and analysis of data provided by Internet of Things devices, seamless and immersive experiences for virtual and augmented reality applications including gaming, interactive learning and virtual tours, applying summarization techniques to network slicing, or a combination thereof.

* * * * *